United States Patent
Lee et al.

(10) Patent No.: US 11,279,067 B2
(45) Date of Patent: Mar. 22, 2022

(54) RESIN MOLDED ARTICLE AND MANUFACTURING METHOD THEREFOR

(71) Applicants: HONDA MOTOR CO., LTD., Tokyo (JP); Sakaiya Co., Ltd., Saitama (JP)

(72) Inventors: Seonghun Lee, Wako (JP); Tatsuya Akimaru, Wako (JP); Takuro Ojima, Kawagoe (JP); Masaru Sugino, Kawagoe (JP)

(73) Assignees: HONDA MOTOR CO., LTD., Tokyo (JP); Sakaiya Co., Ltd., Saitama (JP)

( * ) Notice: Subject to any disclaimer, the term of this patent is extended or adjusted under 35 U.S.C. 154(b) by 0 days.

(21) Appl. No.: 16/671,198

(22) Filed: Nov. 1, 2019

(65) Prior Publication Data

US 2020/0141154 A1    May 7, 2020

(30) Foreign Application Priority Data

Nov. 6, 2018 (JP) .............................. JP2018-208616

(51) Int. Cl.
| | |
|---|---|
| *B29C 45/14* | (2006.01) |
| *E05B 19/04* | (2006.01) |
| *B32B 27/06* | (2006.01) |
| *B29C 45/00* | (2006.01) |
| *D06N 3/00* | (2006.01) |

(52) U.S. Cl.
CPC .... *B29C 45/14778* (2013.01); *B29C 45/0001* (2013.01); *B29C 45/14008* (2013.01); *B32B 27/065* (2013.01); *E05B 19/04* (2013.01); *B32B 2369/00* (2013.01); *D06N 3/00* (2013.01)

(58) Field of Classification Search
CPC ..... B29C 45/00; B29C 45/0001; B29C 45/14; B29C 45/14008; B29C 45/1418; B29C 45/14237; B29C 45/14336; B29C 45/14778; B29C 45/14786;
(Continued)

(56) References Cited

U.S. PATENT DOCUMENTS

| | | |
|---|---|---|
| 2004/0018789 A1 | 1/2004 | Marchbanks et al. |
| 2010/0080968 A1 | 4/2010 | Mizuno et al. |
| 2014/0353874 A1* | 12/2014 | Han ............ G06F 1/1637 264/265 |

FOREIGN PATENT DOCUMENTS

| | | |
|---|---|---|
| CN | 1671533 | 9/2005 |
| JP | 2010-105385 | 5/2010 |

(Continued)

OTHER PUBLICATIONS

Chinese Office Action and Search Report for Chinese Patent Application No. 201911076848.1 dated May 19, 2021, text in English appears only on pp. 1 and 10.
(Continued)

*Primary Examiner* — Walter Aughenbaugh
(74) *Attorney, Agent, or Firm* — Amin, Turocy & Watson, LLP

(57) ABSTRACT

A resin molded article is equipped with a laminated body in which a core material layer, a cushion layer, and a skin layer are included and laminated. In this configuration, a lowermost layer and a peripheral edge portion of the laminated body are covered by a resin covering layer, and only the upper surface of the skin layer is exposed and serves as a design surface. Moreover, the peripheral edge portion of the laminated body is embedded in an interior part of the resin covering layer.

3 Claims, 14 Drawing Sheets

(58) Field of Classification Search
CPC ......... B29C 45/14795; B29C 45/14811; B32B 27/065; B32B 2369/00; D06N 3/00
See application file for complete search history.

(56) References Cited

FOREIGN PATENT DOCUMENTS

| | | |
|---|---|---|
| JP | 2014-046660 | 3/2014 |
| JP | 2014-173203 | 9/2014 |

OTHER PUBLICATIONS

Japanese Office Action for Japanese Patent Application No. 2018-208616 dated Dec. 7, 2021.

\* cited by examiner

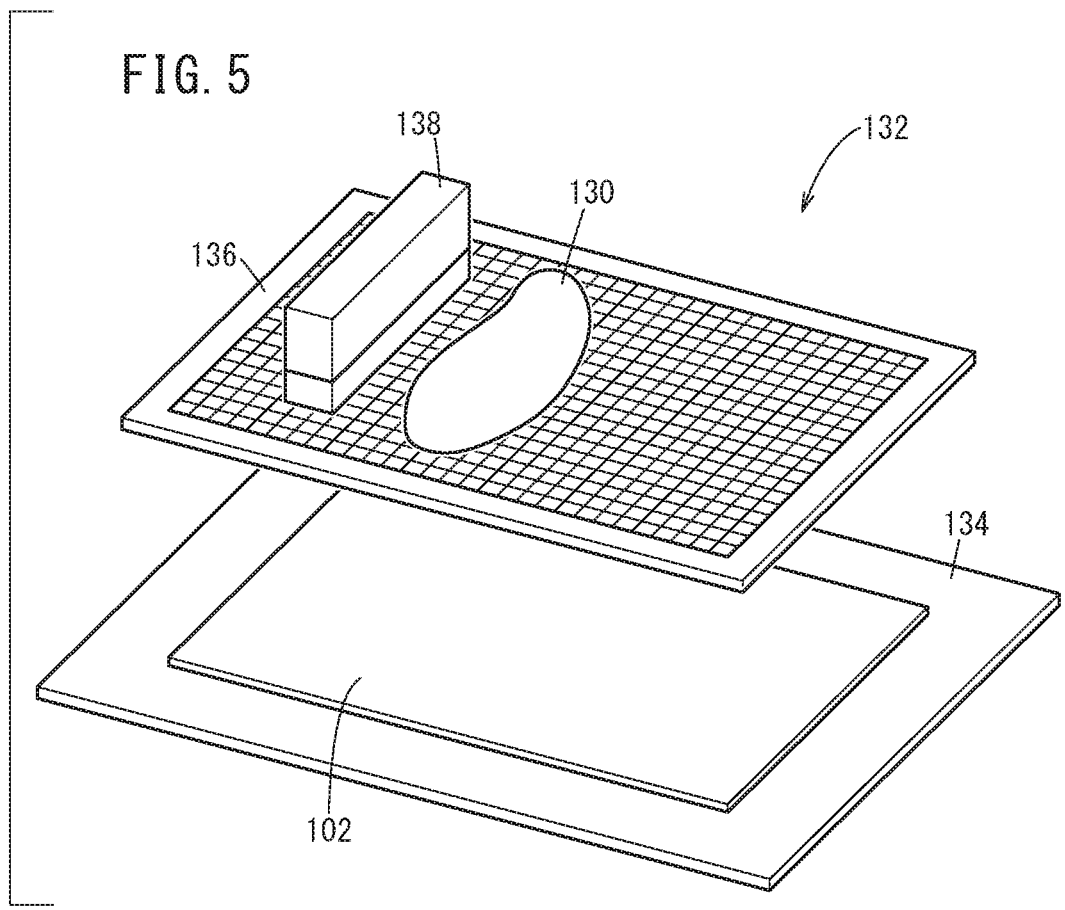

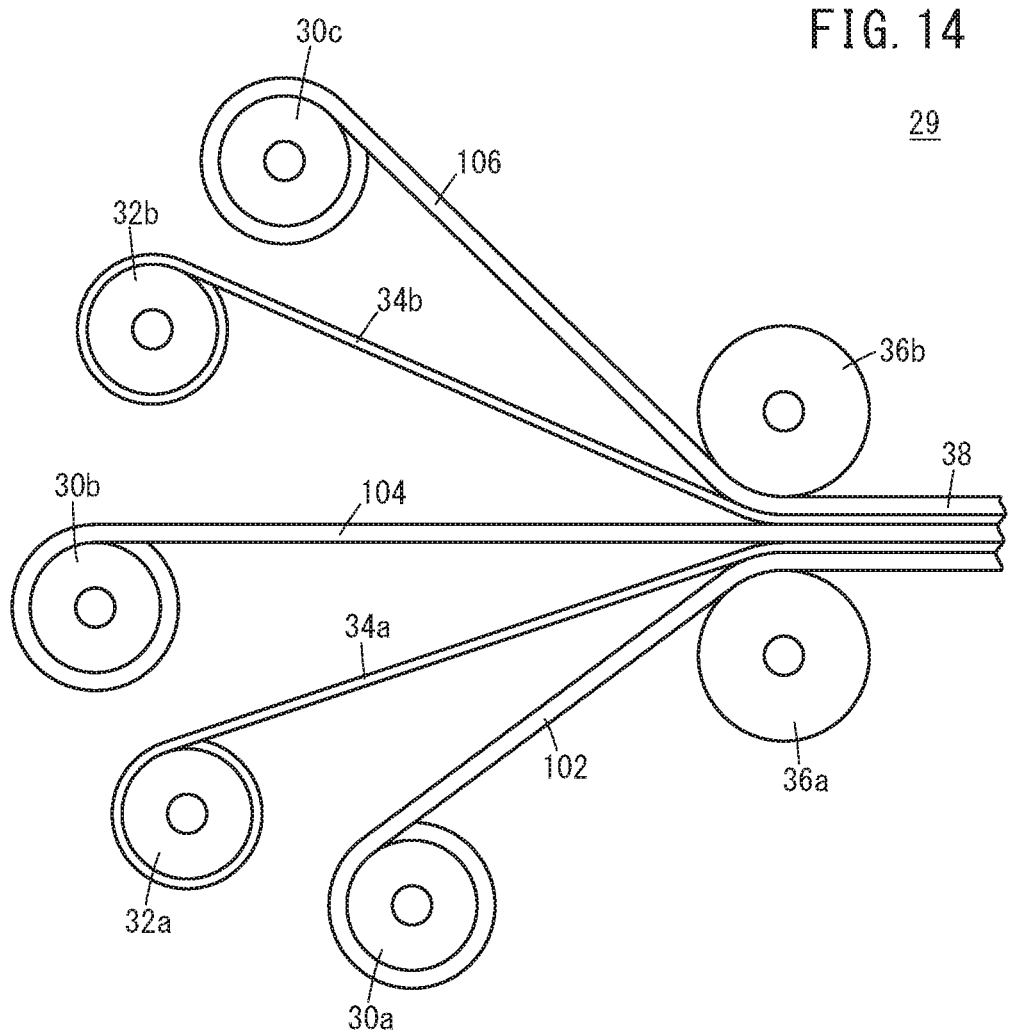

RESIN MOLDED ARTICLE AND MANUFACTURING METHOD THEREFOR

CROSS-REFERENCE TO RELATED APPLICATION

This application is based upon and claims the benefit of priority from Japanese Patent Application No. 2018-208616 filed on Nov. 6, 2018, the contents of which are incorporated herein by reference.

BACKGROUND OF THE INVENTION

Field of the Invention

The present invention relates to a resin molded article and a manufacturing method therefor, the resin molded article being equipped with a laminated body and a resin covering layer covering a peripheral edge portion and a bottom surface portion of the laminated body.

Description of the Related Art

A casing or the like for a smart key for use in an automobile is constituted from a resin molded article, for example. In this case, various modifications have been made to the casing in order to obtain an upscale feeling, as well as to improve the tactile sensation for the user. From this standpoint, in Japanese Laid-Open Patent Publication No. 2014-173203, an artificial leather sheet is proposed in which a smoke printed layer is provided on an elastomer sheet. According to Japanese Laid-Open Patent Publication No. 2014-173203, such an artificial leather sheet can be used as a skin for molding. More specifically, it is considered that a resin molded article that serves as a casing can be obtained by carrying out molding on a base material using the artificial leather sheet.

SUMMARY OF THE INVENTION

Such molding is performed by injecting a molten resin to a workpiece in which a resin material serves as the base material, and then allowing the molten resin to harden. In this instance, it is contrived that the base material is made of a foam material such as urethane foam in order to obtain a casing which has a certain degree of thickness and which is both flexible and lightweight.

However, the heat resistance of urethane foam is not particularly high, and therefore, there is a concern that the urethane foam may become softened or melted due to heat from the molten resin when injection molding is carried out.

A principal object of the present invention is to provide a resin molded article in the form of a molded article which is both flexible and lightweight while also being thick-walled.

Another object of the present invention is to provide a method of manufacturing a resin molded article in order to obtain the above-described resin molded article.

In order to achieve the aforementioned object, according to one embodiment of the present invention, there is provided a resin molded article comprising a laminated body in which a skin layer, a cushion layer, and a core material layer are included and laminated, and a resin covering layer having a bottom portion and a surrounding portion, wherein a lowermost layer of the laminated body is covered by the bottom portion, with a peripheral edge portion of the laminated body being surrounded by the surrounding portion and an upper surface of the skin layer being exposed and serving as a design surface, and the peripheral edge portion of the laminated body is embedded in an interior part of the surrounding portion.

The cushion layer is depressed when a pressing force is applied thereto, and immediately returns to its original shape when the force is removed. Stated otherwise, the cushion layer is flexible and has excellent elasticity. In addition, the cushion layer has a low density. Therefore, the laminated body, and by extension the resin molded article, while being of a certain size, can also be constituted as a flexible and lightweight article.

In addition, in this case, the core material layer functions as a heat insulating body that reduces the heat received by the cushion layer. Accordingly, it is possible to avoid a situation in which the cushion layer becomes excessively softened or melted during molding when the resin covering layer is formed.

The core material layer preferably has a higher melting point than the cushion layer. In accordance with this feature, the core material layer functions more effectively as a heat insulating body.

Further, the laminated body is preferably constituted by laminating the skin layer, the cushion layer, and the core material layer in this order from a side of the design surface, and the core material layer is preferably the lowermost layer. In this case, the molten resin that becomes the bottom portion of the resin covering layer at the time of molding is in contact with only the core material layer, and does not directly contact the cushion layer. Therefore, since the cushion layer is protected from the heat of the molten resin, the cushion layer can be prevented from being excessively softened or melted.

As a suitable example for the material of the skin layer, there may be cited at least one of synthetic leather, artificial leather, and natural leather. In this case, the tactile sensation of the design surface is favorable, and the design surface has a good appearance, and is superior in terms of aesthetics.

On the other hand, as a suitable example for the material of the cushion layer, urethane foam may be cited, and as a suitable example for the material of the core material layer, a polycarbonate sheet may be cited.

According to another embodiment of the present invention, there is provided a method of manufacturing a resin molded article comprising a laminated body in which a skin layer, a cushion layer, and a core material layer are included and laminated, and a resin covering layer having a bottom portion and a surrounding portion, the method comprising a resin covering layer formation step comprising accommodating the laminated body in a cavity of an injection molding apparatus and injecting a molten resin therein, allowing the molten resin to harden to form the resin covering layer having the bottom portion covering a lowermost layer of the laminated body, and the surrounding portion in which a peripheral edge portion of the laminated body is embedded, and obtaining the resin molded article in which an upper surface of the skin layer is exposed and serves as a design surface.

By undergoing such a process, the resin covering layer can be formed without the cushion layer becoming excessively softened or melted. Therefore, the resin molded article which is flexible and lightweight while having a certain size can be obtained.

In a machining step, the laminated body is preferably machined into a predetermined shape. In this case, the resin covering layer may be formed (the resin covering layer formation step may be performed) on the laminated body which has been subjected to machining. In accordance with this feature, the amount of molten resin used for forming the resin covering layer can be reduced. Accordingly, costs can be reduced.

The peripheral edge portion of the laminated body, which has been subjected to machining in the machining step, is preferably bent. Stated otherwise, a bending step of bending the peripheral edge portion may be performed on the laminated body. Thereafter, the resin covering layer is formed (the resin covering layer formation step is performed) on the laminated body, the peripheral edge portion of which has been bent, whereby a three-dimensional resin molded article can be obtained.

According to the present invention, the resin molded article is constituted by providing the resin covering layer having the bottom portion that covers the lowermost layer, and the surrounding portion that covers the peripheral edge portion, in the laminated body in which the skin layer, the cushion layer, and the core material layer are included and laminated. When the resin covering layer is molded, the core material layer serves as a heat insulating body for the cushion layer. Therefore, the heat that the cushion layer receives from the molten resin is reduced, and the cushion layer can be prevented from being excessively softened or melted.

As a result, a resin molded article which is flexible and lightweight while having a certain size can be constructed.

The above and other objects, features, and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIG. 5 is a schematic perspective view of principal parts of a screen coating device by which an adhesive is applied to a sheet;

FIG. 14 is a schematic side view of principal parts of a laminating apparatus for obtaining the resin molded article.

DESCRIPTION OF THE PREFERRED EMBODIMENTS

A preferred embodiment of a resin molded article will be presented and described in detail below with reference to the accompanying drawings, in relation to a manufacturing method therefor, and an injection molding apparatus for obtaining the resin molded article.

Figure 1:
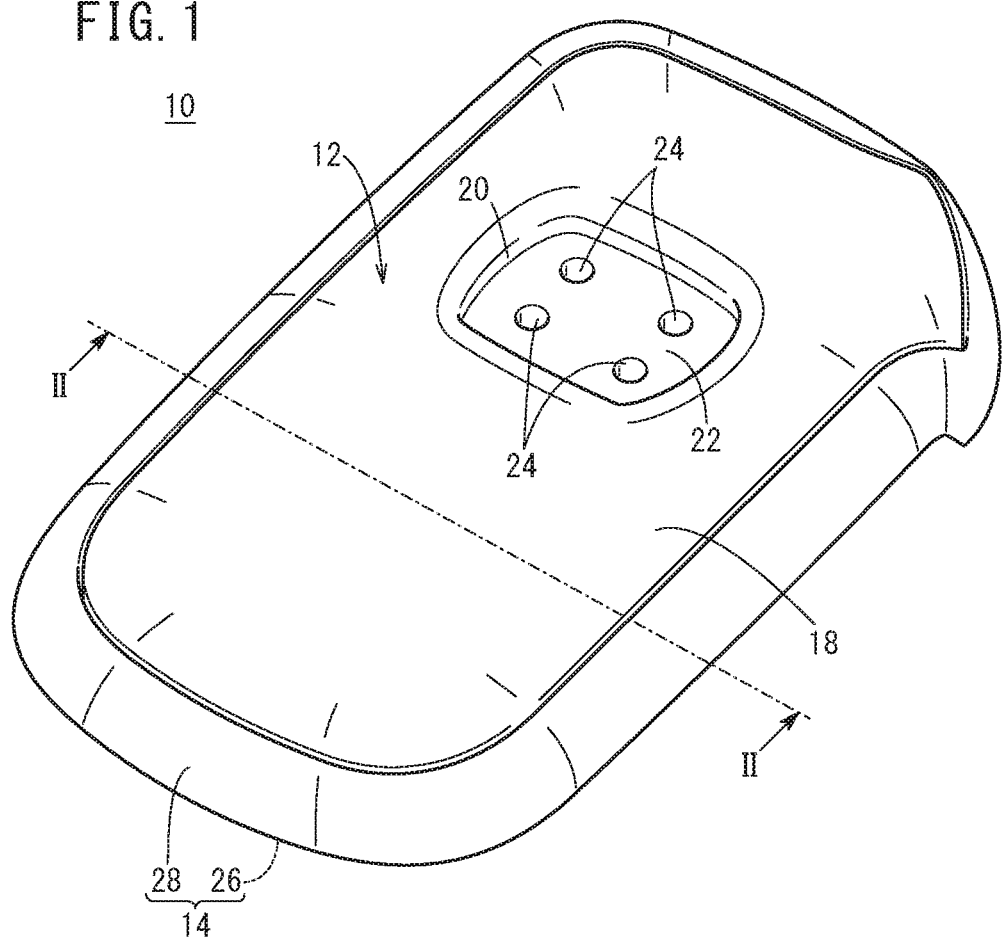
FIG. 1 is an overall schematic perspective view of a resin molded article according to an embodiment of the present invention.
Figure 2:
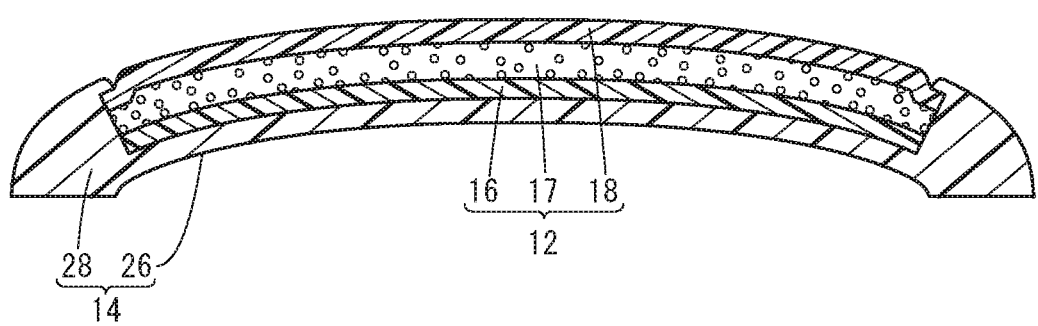
FIG. 2 is a cross-sectional view taken along line II-II in FIG. 1.

FIG. 1 is an overall schematic perspective view of a resin molded article 10 according to an embodiment of the present invention, and FIG. 2 is a cross-sectional view taken along line II-II in FIG. 1. The resin molded article 10 includes a laminated body 12 (main body portion), and a resin covering layer 14 that covers the laminated body 12, and is opened so as to expose only an upper surface (design surface) of the laminated body 12.

As shown in FIG. 2, the laminated body 12 has a three-layer structure including a core material layer 16, a cushion layer 17, and a skin layer 18. The core material layer 16 is a lowermost layer, the cushion layer 17 is an intermediate layer, and the skin layer 18 is an uppermost layer. An upper surface of the skin layer 18 is a design surface that is visible to the user. The core material layer 16 which is the lowermost layer is made from a material that is superior in terms of heat resistance (in other words, having a sufficiently high softening point or melting point), for example, a resin material such as a plastic sheet. As preferred examples for this type of resin material, there may be cited polycarbonate, polymethyl methacrylate, polypropylene, polyethylene, acrylonitrile-butadiene-styrene copolymer, or the like.

The cushion layer 17 has the largest thickness among the three layers, and serves as a main layer of the laminated body 12. More specifically, the thickness of the laminated body 12 is adjusted by the thickness of the cushion layer 17. The cushion layer 17 has a certain degree of flexibility and elasticity so as to be depressed when a pressing force is applied thereto, and to be immediately returned to its original shape when the force is removed. Moreover, the cushion layer 17 has a low density. Therefore, the laminated body 12, and by extension the resin molded article 10, possesses flexibility, and while the resin molded article 10 is of a certain size, it can also be lightweight. Moreover, although a foam material is cited as a raw material that exhibits the aforementioned characteristics, and in particular, urethane foam was cited as a suitable specific example, alternatively, an olefin type or a silicone type of foam material may also be used.

The softening point or the melting point of urethane foam is lower than that of a polycarbonate sheet. More specifically, in this case, the melting point of the core material layer 16 is higher than that of the cushion layer 17, and therefore, the core material layer 16 exhibits excellent heat resistance.

The skin layer 18 can be formed, for example, from a flexible material such as cloth, elastomer, or paper. However, for the skin layer 18, there is preferably selected at least one of synthetic leather, artificial leather, and natural leather. In this case, it is possible to obtain a design surface which has a favorable tactile sensation, provides an upscale feeling and has an excellent appearance.

An annular groove 20, which is offset toward one end side from the center in the longitudinal direction, is formed on the laminated body 12, and a step portion 22, which protrudes relatively with respect to the annular groove 20, is provided inside the annular groove 20. The step portion 22 has a substantially rectangular shape when viewed in plan, and bottomed holes 24, which are substantially circular in cross section, are formed at the four corners thereof.

The step portion 22 can be used, for example, as a site on which some kind of ornament is disposed. The bottomed holes 24 may be used as locations into which pins or the like are inserted for attaching the ornament.

The bottom surface of the annular groove 20 and the bottom surfaces of the bottomed holes 24 are both closed wall surfaces. For this reason, even if water droplets from rainwater or the like become adhered to the design surface, such water droplets are prevented from entering the interior of the resin molded article 10 from the annular groove 20 or the bottomed holes 24.

The resin covering layer 14 includes a bottom portion 26 that covers a rear surface of the design surface (skin layer 18) of the laminated body 12, and a surrounding portion 28 that surrounds the peripheral edge portion of the laminated body 12. More specifically, the upper surface of the skin layer 18 is exposed from the resin covering layer 14, and therefore, as noted above, the user is able to visually recognize the exposed upper surface as a design surface.

The peripheral edge portion of the laminated body 12 is embedded inside the surrounding portion 28. Stated otherwise, the surrounding portion 28 is affixed to the peripheral edge portion in a state with a part of the peripheral edge portion being included (enclosed) therein. Due to being affixed while enclosing in this manner, a seal is formed between the surrounding portion 28 and the peripheral edge portion of the laminated body 12. By means of such a seal, water droplets or the like are prevented from entering the resin molded article 10 from between the laminated body 12 and the resin covering layer 14.

As the material of the resin covering layer 14, a material is selected which is capable of being fused to the core material layer 16, or which can be bonded thereto via a binder. More specifically, preferable materials are acrylonitrile-butadiene-styrene (ABS) resin, polymethyl methacrylate (PMMA) resin, and polycarbonate (PC) resin, or the like.

Such a resin molded article 10 can be obtained by manufacturing the resin covering layer 14 by molding accompanying the injection of a molten resin. Hereinafter, a description will be given concerning a method of manufacturing the resin molded article 10.

Figure 3:
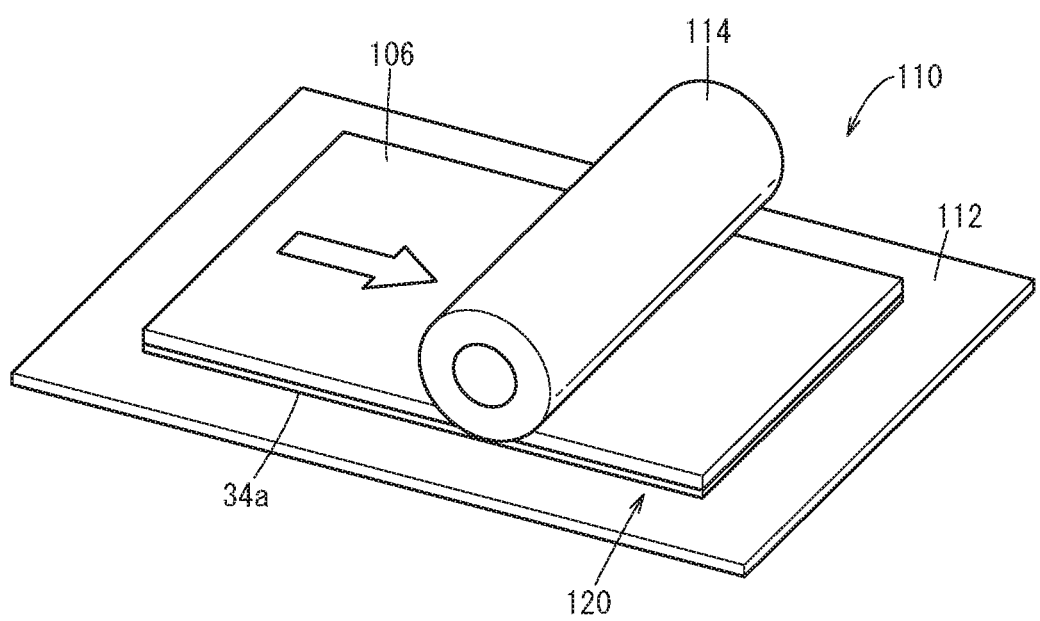
FIG. 3 is a schematic perspective view of principal parts of a pressure applying device for obtaining a laminated body.

At first, the laminated body 12 is produced. In order to do so, initially, a core material sheet 102, a cushion sheet 104 (see FIG. 4A), and a skin sheet 106 shown in FIG. 3 that are respectively formed into the core material layer 16, the cushion layer 17, and the skin layer 18, and a first adhesive sheet 34a (see FIG. 3) and a second adhesive sheet 34b (see FIG. 4A) are cut out. The skin sheet 106 is superimposed on the first adhesive sheet 34a, and in this state, is placed on a conveyor belt 112 that constitutes part of a pressure applying device 110. The pressure applying device 110 includes a pressure applying roller 114, and when the conveyor belt 112 is operated and turned, the laminate of the first adhesive sheet 34a and the skin sheet 106 is pressed by the pressure applying roller 114. As a result, one end surface of the first adhesive sheet 34a is bonded to the skin sheet 106, and a first superimposed body 120 is obtained.

Figure 4A:
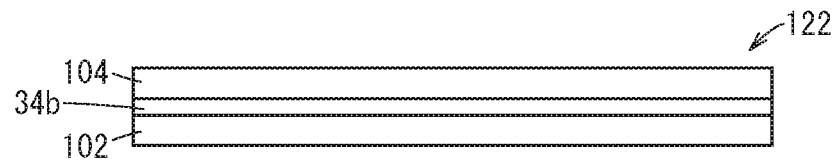
FIGS. 4A, 4B and 4C are schematic flow diagrams illustrating steps until a sheet laminated article is obtained.

Similarly, the core material sheet 102 is bonded to one end surface of the second adhesive sheet 34b, and thereafter, the cushion sheet 104 is bonded to another end surface of the second adhesive sheet 34b, thereby obtaining a second superimposed body 122 as shown in FIG. 4A. The order in which the core material sheet 102 and the cushion sheet 104 are bonded may be reversed.

Figure 4B:
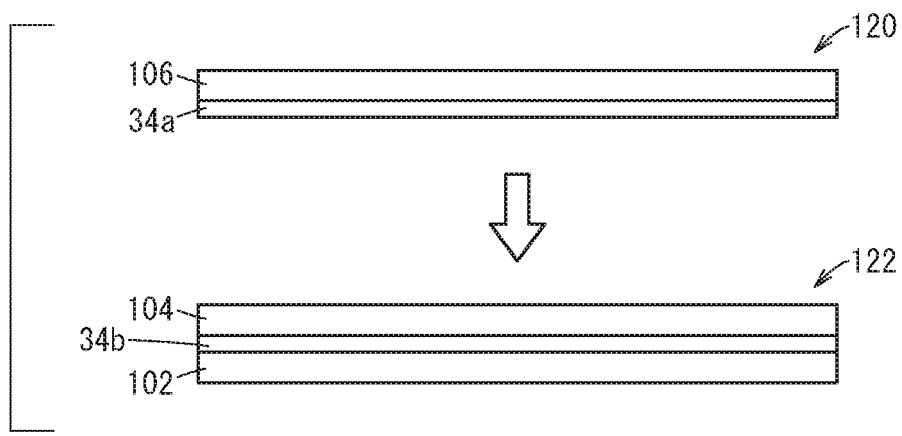
Figure 4C:
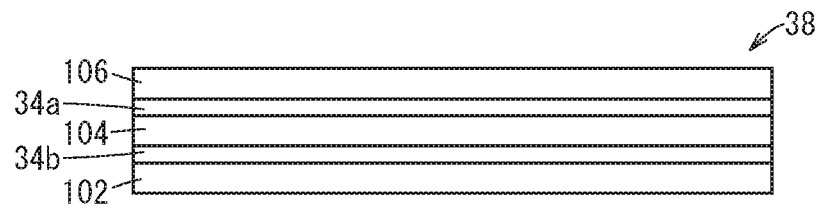

Furthermore, as shown in FIG. 4B, another end surface of the first adhesive sheet 34a constituting the first superimposed body 120 is bonded to one end surface of the cushion sheet 104. In accordance with the above-described procedure, as shown in FIG. 4C, a sheet laminated article 38 is obtained, in which the second adhesive sheet 34b is interposed between the core material sheet 102 (core material layer 16) and the cushion sheet 104 (cushion layer 17), and the first adhesive sheet 34a is interposed between the cushion sheet 104 (cushion layer 17) and the skin sheet 106 (skin layer 18).

A paste adhesive 130 as shown in FIG. 5 can be used instead of a sheet-shaped (tape-shaped) adhesive such as the first adhesive sheet 34a and the second adhesive sheet 34b. In this case, coating (printing) of the paste adhesive 130 may be carried out using a screen coating device 132.

To offer a brief description of this method, the screen coating device 132 includes a support base 134 and a screen 136. An application object to which the paste adhesive 130 is applied, for example, the core material sheet 102, is mounted on the support base 134. Meanwhile, the paste adhesive 130 is supplied onto the screen 136, is spread by a squeegee 138 that moves on the screen 136, passes through the screen 136, and is applied in a predetermined pattern to one end surface of the core material sheet 102.

Next, the cushion sheet 104 is superimposed on the one end surface of the core material sheet 102 to which the paste adhesive 130 has been applied. A semi-finished product which is obtained in this manner is pressed by the pressure applying roller 114 in the same manner as described above, and the core material sheet 102 and the cushion sheet 104 are bonded together.

Similarly, the paste adhesive 130 is applied to the one end surface of the cushion sheet 104, and the skin sheet 106 is further placed thereon to obtain a superimposed body. When the superimposed body is pressed by the pressure applying roller 114 in the same manner as described above, the cushion sheet 104 and the skin sheet 106 are bonded together, and the sheet laminated article 38 (see FIG. 4C) is obtained.

Figure 6:
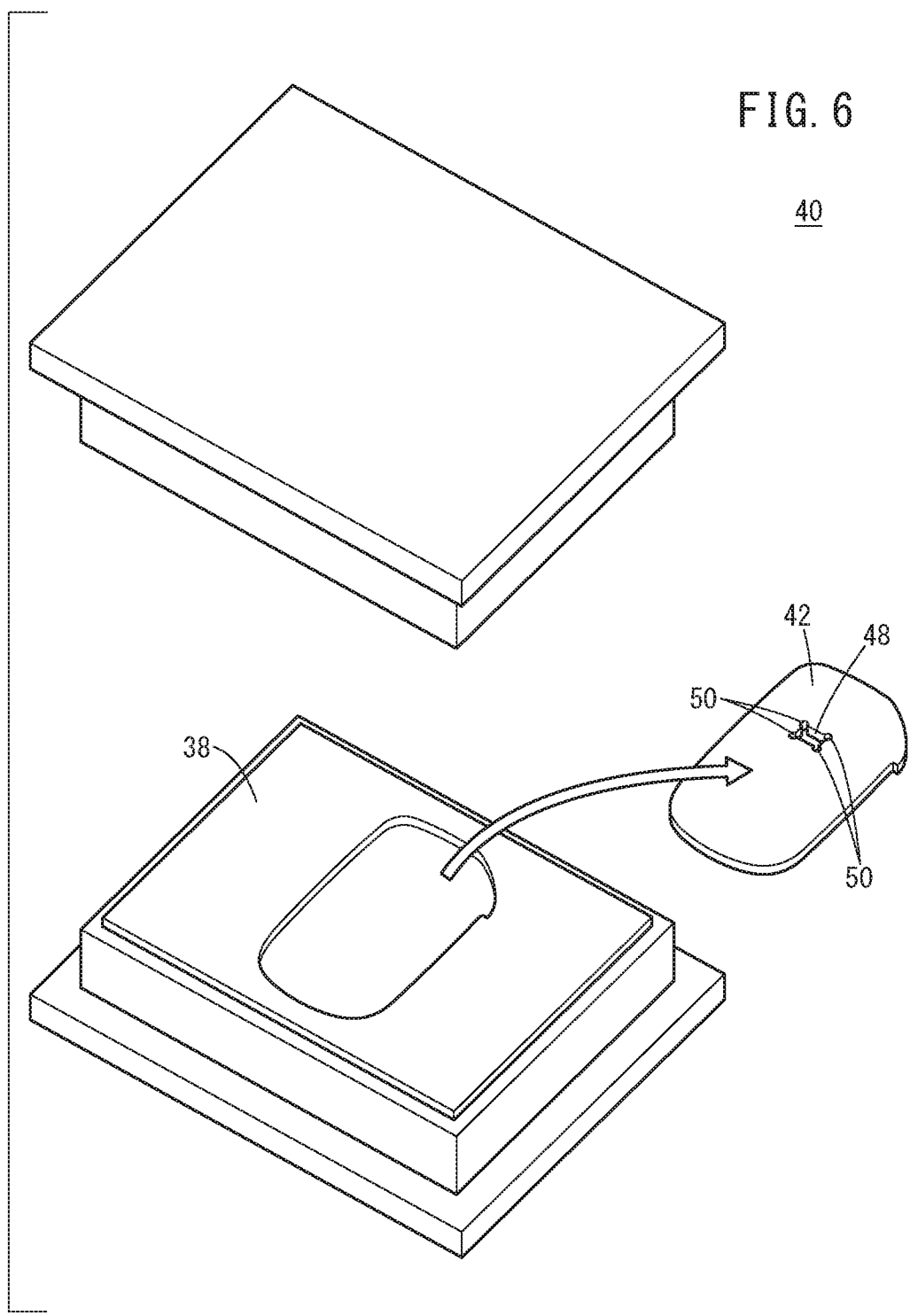
FIG. 6 is a schematic perspective view of principal parts of a trimming device that performs a trimming process on the sheet laminated article, and thereby obtains a trimmed product.

The sheet laminated article 38 is cut to an appropriate length. The sheet laminated article 38 is subjected to a trimming process (machining step) by a trimming device 40 shown in FIG. 6, whereby a trimmed product 42 which has a substantially elongated hole shape therein and in which an opening 48, and holes 50 connected to the four corners of the opening 48 are formed.

Figure 7:
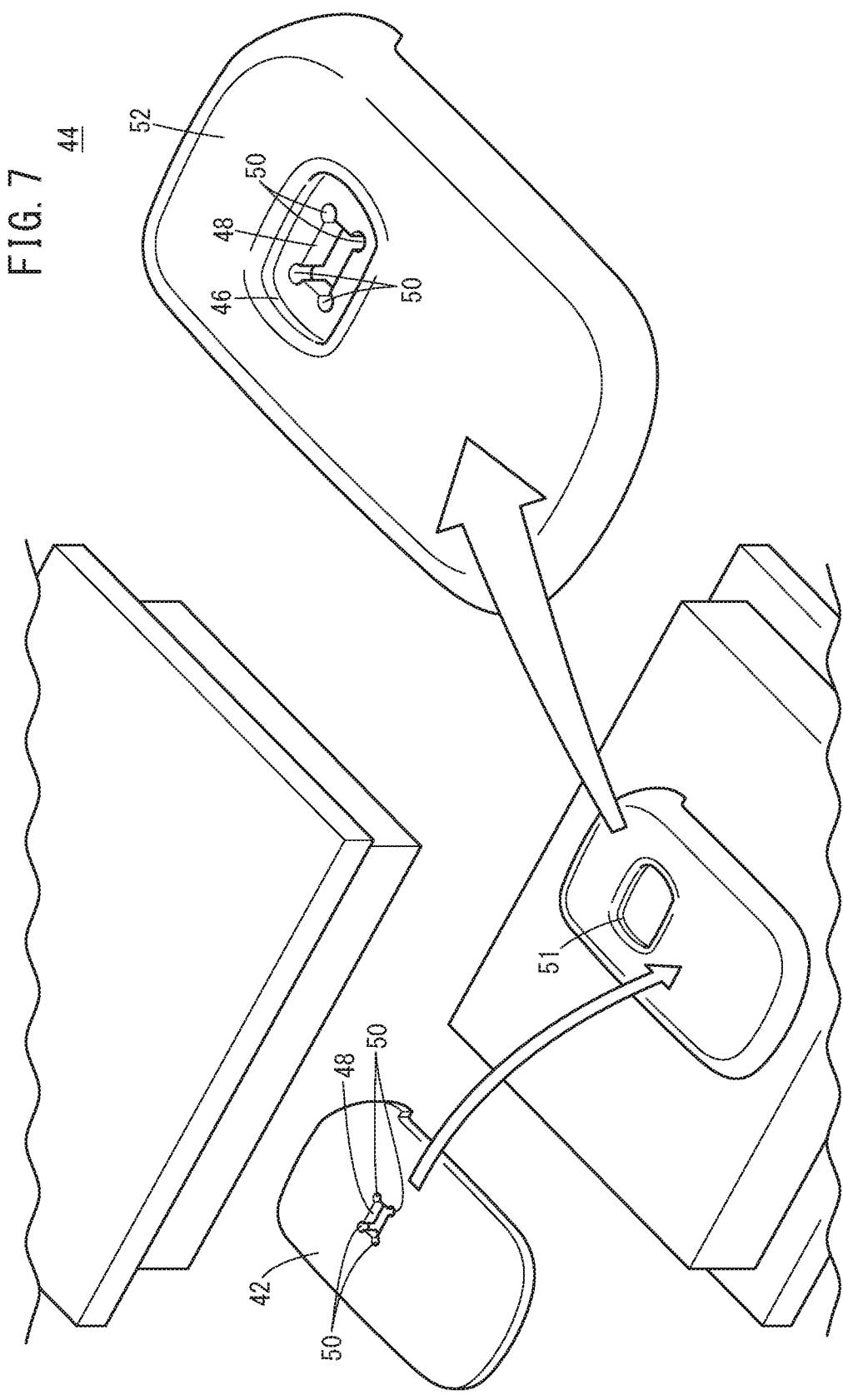
FIG. 7 is a schematic perspective view of principal parts of a hot press device that carries out hot pressing on the trimmed product, and thereby obtains a workpiece.

Next, hot pressing is performed by a hot press device 44 that is shown in FIG. 7. As a result, a recess 46 corresponding to a recess forming part 51 of the hot press device 44 is formed on the trimmed product 42. The opening 48 and the holes 50 are located in the recess 46. Further, by means of such hot pressing, a bending process is performed in which a peripheral edge portion of the trimmed product 42 is bent.

Consequently, the recess 46, the opening 48 inside the recess 46, and the holes 50 connected to the opening 48 are formed, and a workpiece 52 which has a bent peripheral edge portion is obtained. The four holes 50 extend along the thickness direction of the workpiece 52, or in other words, along the stacking direction of the sheet laminated article 38. Further, the direction in which the peripheral edge portion is bent is toward the side of the core material layer 16.

Moreover, instead of the above-described technique, the recess 46, the opening 48, and the holes 50 may be formed when hot pressing is carried out.

Figure 8:
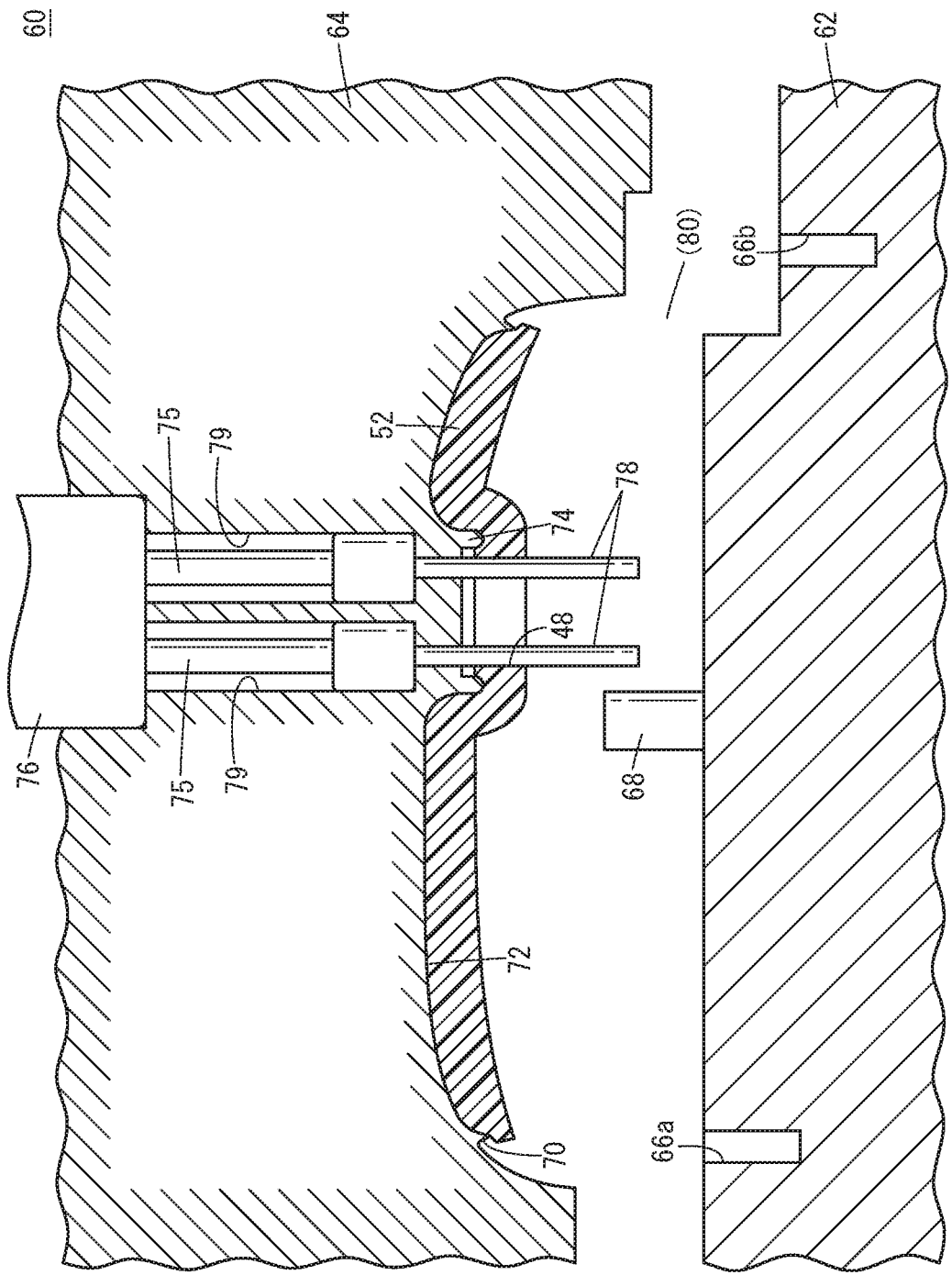
FIG. 8 is a schematic vertical cross-sectional view of principal parts of an injection molding apparatus for carrying out molding on the workpiece.

Next, molding (a resin layer forming step) is carried out by injection molding. FIG. 8 is a schematic vertical cross-sectional view of principal parts of an injection molding apparatus 60 for carrying out injection molding. The injection molding apparatus 60 includes a lower die 62 serving as a first mold, and an upper die 64 serving as a second mold. The lower die 62 is a fixed die that is positioned and fixed in place, and the upper die 64 is a movable die that approaches toward or separates away from the lower die 62 under the action of a non-illustrated lifting and lowering mechanism.

Figure 9:
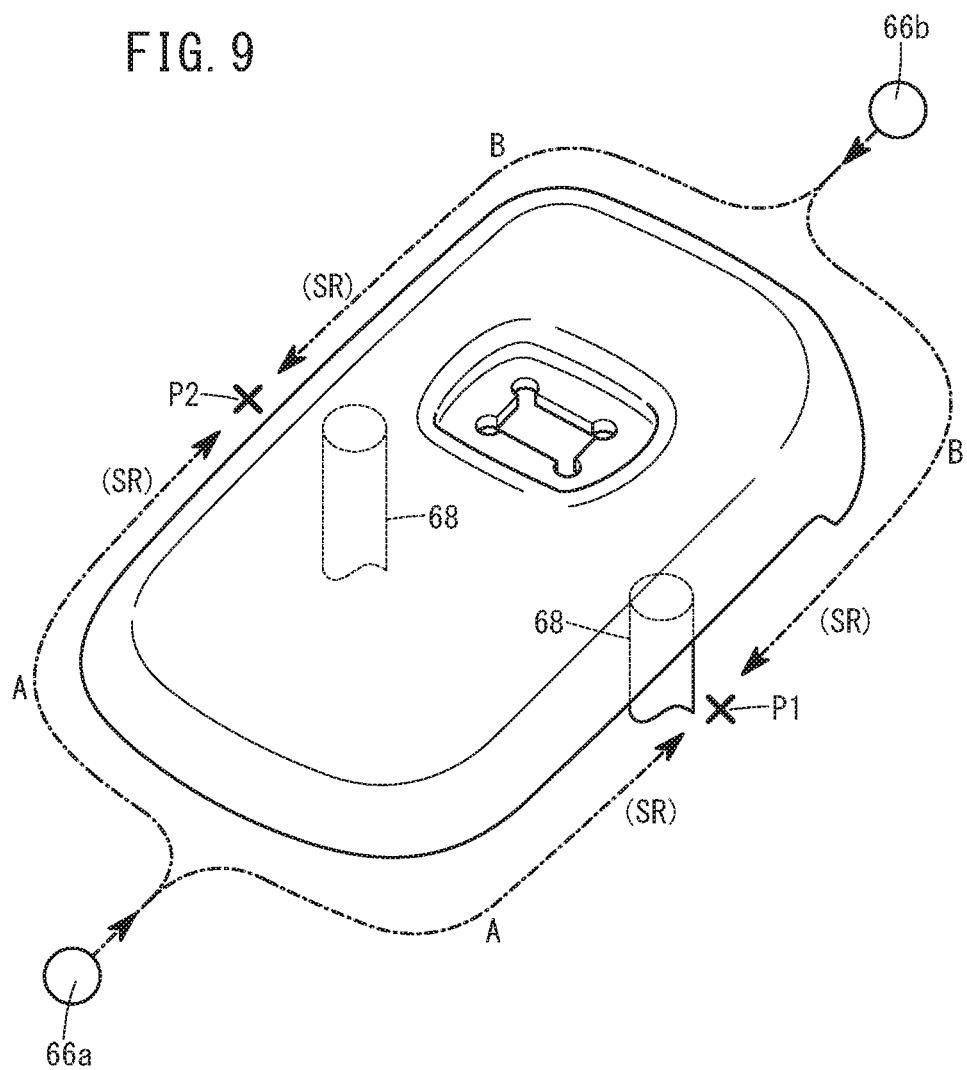
FIG. 9 is a schematic explanatory view showing a flow direction of molten resin in a cavity of the injection molding apparatus.
Figure 12:
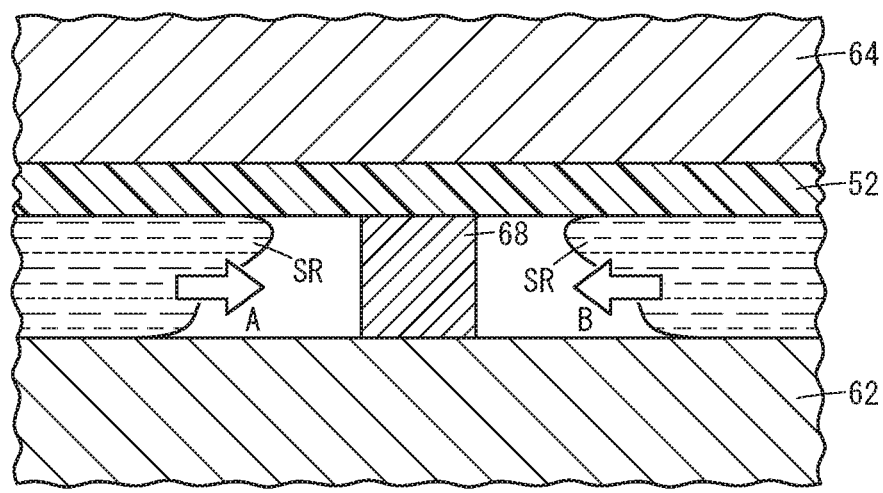
FIG. 12 is an enlarged vertical cross-sectional view of principal parts of locations where a molten resin that has flowed separately into the cavity is predicted to merge.

Two injection members 66a and 66b, which are connected via runners to a gate, are formed on the lower die 62. The injection members 66a and 66b open at positions in proximity to respective end parts in the longitudinal direction of the workpiece 52. Moreover, as shown in FIGS. 9 and 12, molten resin SR which is injected from the injection members 66a and 66b flows separately in the directions indicated by the arrows A and B, respectively. In addition, it is estimated that the molten resin SR will merge at points P1 and P2, which are substantially intermediate points between the injection members 66a and 66b.

Pressing pins 68 (pressing members) are provided respectively in portions corresponding to the points P1 and P2 where the flowing molten resin SR is predicted to merge. The pressing pins 68 support the workpiece 52 by pressing the workpiece 52 from the side of the core material layer 16.

An annular protrusion 70 that projects toward the lower die 62 is provided on the upper die 64. A retaining section 72 for retaining the workpiece 52 is defined inside the annular protrusion 70. Further, an annular convex portion 74 that enters the recess 46 is formed in a projecting manner on the upper die 64.

Furthermore, a cylinder 76 having four rods 75 is positioned and fixed on the upper die 64, and sliding pins 78 (sliding members) are provided at respective distal ends of the rods 75. It should be noted that, in FIG. 8, only two of the four sliding pins 78 are shown. Within rod holes 79 that are provided in the upper die 64, the rods 75 are capable of being displaced in directions toward or away from a cavity 80 (see FIG. 11). Of course, the sliding pins 78 are integrally displaced following this displacement.

The resin molded article 10 is manufactured in the manner described below using the injection molding apparatus 60.

Figure 10:
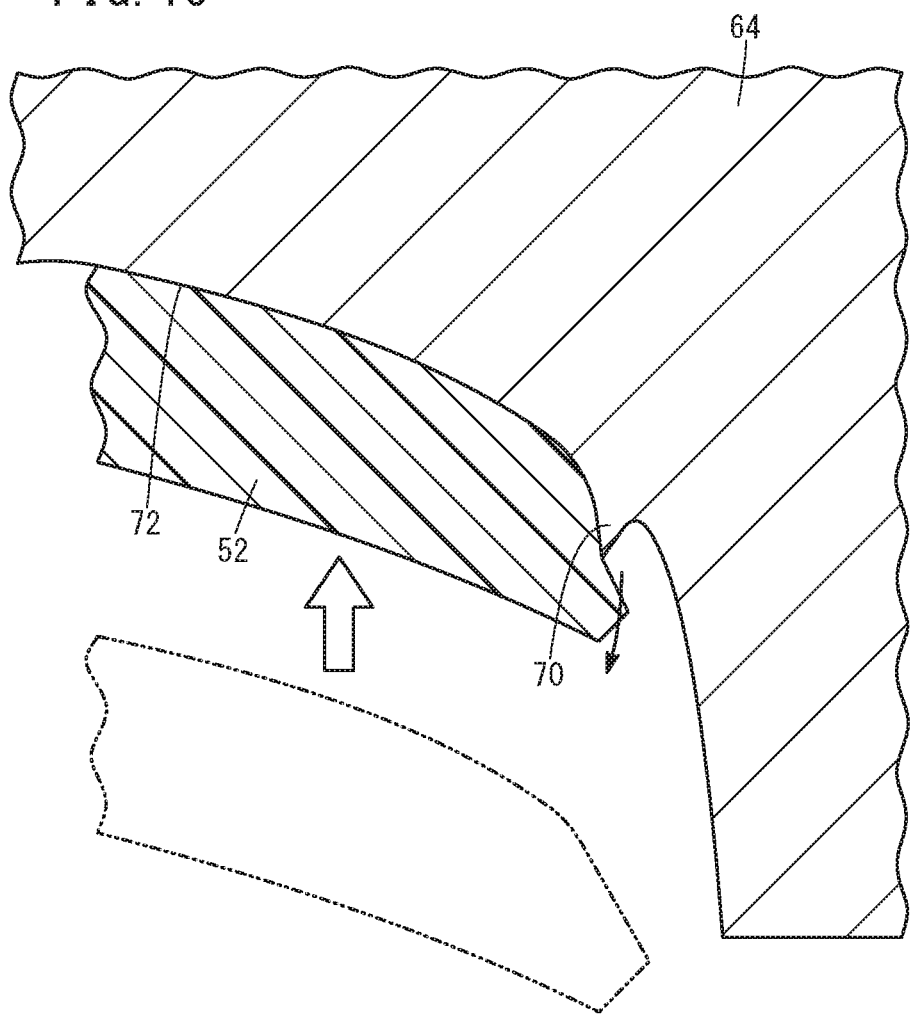
FIG. 10 is an enlarged cross-sectional view of principal parts of an upper die constituting the injection molding apparatus shown in FIG. 8.

More specifically, at first, the workpiece 52 obtained in the manner described above is retained in the retaining section 72 as shown in FIG. 8. For this purpose, the workpiece 52 may be placed in a posture with the core material layer 16 thereof facing downward, and transported to the vicinity of the retaining section 72, and furthermore, a pressing force directed toward the upper die 64 may be applied to the workpiece 52. In this instance, the surface area of the workpiece 52 is slightly larger than the surface area of the retaining section 72 that is defined by the annular protrusion 70. Therefore, as shown in FIG. 10, the peripheral edge portion of the workpiece 52 is positioned slightly outside of the annular protrusion 70. In this state, when a pressing force is further applied to the workpiece 52, the peripheral edge portion of the workpiece 52 is bent by the annular protrusion 70. In other words, at this point in time, a further bending process is performed on the peripheral edge portion of the workpiece 52. Due to the bending process, the workpiece 52, and by extension the resin molded article 10, is formed in a three-dimensional shape.

As a result, the workpiece 52 is pressed into the annular protrusion 70 in a state in which the shape of the peripheral edge portion thereof follows the shape of the annular protrusion 70, and together therewith, the skin layer 18 abuts against a ceiling surface of the upper die 64, and the peripheral edge portion abuts against the inner side surface of the annular protrusion 70. Further, the annular convex portion 74 enters so that the outer wall thereof lies along the inner wall of the recess 46. By inwardly pressing the workpiece 52 in the manner described above, a pressing force acts on the peripheral edge portion of the workpiece 52 from the annular protrusion 70, and a pressing force acts on the inner wall of the recess 46 from the annular convex portion 74, whereby the workpiece 52 is retained in the retaining section 72.

Further, the cylinder 76 is energized, and the rods 75 move downwardly toward the lower die 62. As a result, the sliding pins 78 are inserted into the holes 50 that are formed in the workpiece 52, and thereafter project outwardly from the holes 50. In this manner, by the sliding pins 78 being inserted into the holes 50, the workpiece 52 is more effectively retained on the upper die 64.

Figure 11:
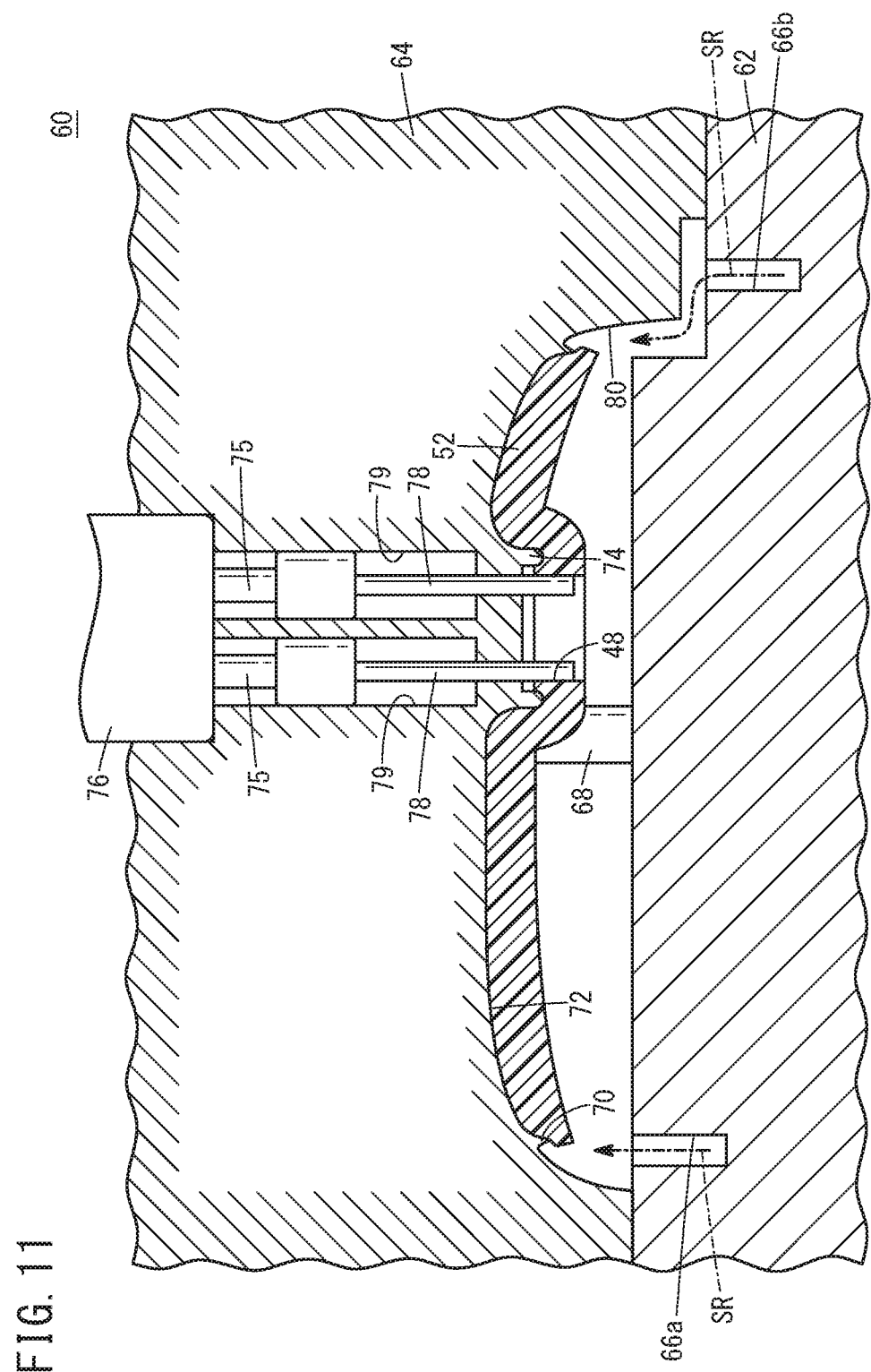
FIG. 11 is a schematic vertical cross-sectional view showing principal parts, and showing a state in which a cavity is formed by performing clamping in the injection molding apparatus shown in FIG. 8.

Next, the lifting and lowering mechanism is energized, and the upper die 64 is lowered toward the lower die 62. Finally, the upper die 64 is placed in close contact with the lower die 62 and die clamping is further performed, together with the cavity 80 being formed therein as shown in FIG. 11. At this time, the pressing pins 68 press the workpiece 52 at points P1 and P2 as shown in FIG. 9. This state is also shown in FIG. 12. Due to being pressed in this manner, portions of the workpiece 52 are prevented from being pressed toward the lower die 62.

Next, the molten resin SR is injected from a non-illustrated injection mechanism. The molten resin SR passes from the gate and through the runners, and is injected into the cavity 80 from the injection members 66a and 66b. At this time, the molten resin SR that has been injected from the injection member 66a flows according to the arrows A, whereas the molten resin SR that has been injected from the injection member 66b flows according to the arrows B. Both portions of the molten resin SR are predicted to merge at points P1 and P2, or in the vicinity thereof (see FIG. 9).

Figure 13:
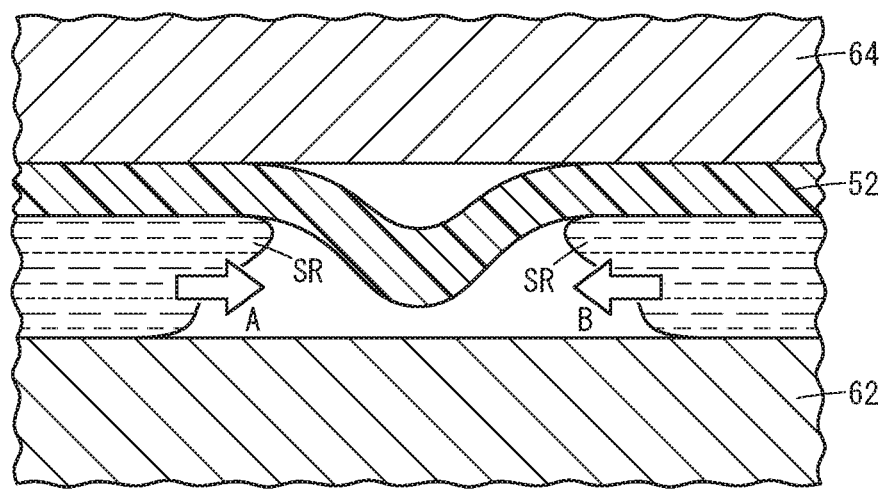
FIG. 13 is an enlarged vertical cross-sectional view of principal parts of locations where a molten resin that has flowed separately into the cavity is predicted to merge, when a pressing member does not exist in the cavity.

In the vicinity of the merging points, the workpiece 52 receives pressure from the molten resin SR flowing in directions opposite to each other. Accordingly, under a condition in which the pressing pins 68 do not exist, as shown in FIG. 13, there is a concern that portions which have been pressed from both directions may be pushed out toward the merging points, and buckling may occur.

In contrast thereto, according to the present embodiment, the workpiece 52 is pressed by the pressing pins 68 (see FIG. 12). Accordingly, even if the workpiece 52 is pressed at points P1 and P2 from both directions by the molten resin SR, the workpiece 52 is prevented from being pushed out, and as a result, from being bent toward the lower die 62. Stated otherwise, any concern that buckling may occur can be eliminated.

A portion of the molten resin SR passes through the opening 48 of the workpiece 52, and fills the interior of the annular convex portion 74. By hardening of this portion of the molten resin SR, the annular groove 20 and the step portion 22 are formed (see FIG. 1). Moreover, during filling of the molten resin SR, the rods 75 are displaced (raised) in a direction away from the cavity 80. The sliding pins 78 are integrally displaced following this displacement, and spaces are formed in the trails left behind the displacement thereof. The molten resin SR also enters such spaces.

The distal ends of the sliding pins 78 do not separate away from the holes 50. Therefore, a situation is avoided in which the workpiece 52 becomes shifted in position during injection of the molten resin SR. In addition, based on the sliding pins 78 remaining inside the holes 50, the bottomed holes 24 are formed in the step portion 22. In the manner described above, the step portion 22 in which the bottomed holes 24 are formed, and the annular groove 20 are formed.

Ultimately, according to the present embodiment, the step portion 22, which can be used as an attachment site, can be formed simultaneously when the resin covering layer 14 is molded. Stated otherwise, there is no need for the step portion 22 to be manufactured by a separate process or a separate device, and there is no need for the step portion 22 to be joined to the workpiece 52. Accordingly, investments in equipment can be made less expensive, and the manufacturing cost of the resin molded article 10 can be reduced.

In addition, as described above, the bottomed holes 24 which are formed in the step portion 22 are closed at the bottom surfaces thereof. Accordingly, any concern that water droplets or the like may enter the resin molded article 10 from the bottomed holes 24 is eliminated.

Further, the molten resin SR covers the entirety of the core material layer 16, and wraps around the peripheral edge portion of the workpiece 52. After injection of a predetermined amount of the molten resin SR, the molten resin SR hardens upon cooling, whereby the resin covering layer 14 is formed having the bottom portion 26 that covers the core material layer 16, and the surrounding portion 28 that includes (encloses) the peripheral edge portion of the workpiece 52, and as a result, the resin molded article 10 is obtained.

In the above process, the molten resin SR primarily comes into contact with the core material layer 16, which exhibits superior heat resistance (has a high melting point) in comparison with the cushion layer 17. Therefore, since the cushion layer 17 is prevented from melting due to being exposed to the heat of the molten resin SR, it is possible to obtain the resin molded article 10 which has a predetermined thickness, as well as being flexible and lightweight.

Further, the surrounding portion 28 wraps around the peripheral edge portion of the workpiece 52 that has been bent beforehand. The bent peripheral edge portion exhibits a so-called anchor effect with respect to the surrounding portion 28. Therefore, the resin covering layer 14 is less likely to fall off from the laminated body 12 (workpiece 52). Accordingly, the reliability of the resin molded article 10 is enhanced, and the resin molded article 10 can be used over a long period of time.

Thereafter, opening of the mold is performed, and the resin molded article 10 is removed from the upper die 64. To facilitate the removal, for example, the resin molded article 10 may be pushed out by a non-illustrated ejector pin.

On the rear surface of the surrounding portion 28, trace holes that are depressed toward the side of the design surface are formed at positions corresponding to the pressing pins 68. Since the trace holes are formed on the rear surface which is not normally recognized visually by the user, the appearance of the resin molded article 10 is not impaired.

The present invention is not particularly limited to the embodiment described above, and various modifications thereto are possible without departing from the essence and gist of the present invention.

For example, it is a matter of course that the resin molded article 10 can be used as an article other than a casing for a smart key. Further, in applications where electromagnetic wave radiation does not present a problem, the core material layer 16 may be made of metal.

Furthermore, the number of the injection members may be one, or may be three or more. In either of such cases, a simulation may be performed in relation to the flow of the molten resin SR, and the pressing pins 68 may be disposed at points where merging of the molten resin SR is predicted to occur. When one individual injection member is provided, the molten resin SR merges after having undergone branching once. The pressing pin 68 is disposed at the point where such merging is predicted to occur.

Similarly, in the case of an injection molding apparatus in which the positions of the injection members 66a and 66b are different, a simulation is performed in relation to the flow of the molten resin SR, and the pressing pins 68 are disposed at points where merging of the molten resin SR is predicted to occur. Consequently, it is possible to effectively avoid the occurrence of buckling in the workpiece 52.

Furthermore, it is also possible to manufacture the sheet laminated article 38 from band-shaped sheet materials. In this case, a laminating apparatus 29 as shown in FIG. 14 may be used.

The laminating apparatus 29 includes a first main roll 30a through a third main roll 30c. The core material sheet 102, the cushion sheet 104, and the skin sheet 106, which are belt-shaped sheet materials respectively formed into the core material layer 16, the cushion layer 17, and the skin layer 18, are wound respectively on the first main roll 30a through the third main roll 30c. Further, a first sub roll 32a and a second sub roll 32b are disposed respectively between the first main roll 30a and a second main roll 30b, and between the second main roll 30b and the third main roll 30c. The first adhesive sheet 34a and the second adhesive sheet 34b are wound respectively on the first sub roll 32a and the second sub roll 32b. More specifically, the first main roll 30a through the third main roll 30c serve as raw material supplying rolls, and the first sub roll 32a and the second sub roll 32b serve as adhesive supplying rolls.

A pair of pressing rollers 36a and 36b are disposed downstream from the first main roll 30a through the third main roll 30c, the first sub roll 32a, and the second sub roll 32b in the sheet-feeding direction. The respective sheets 102, 104, and 106 are pressed by the pressing rollers 36a and 36b, and are bonded to each other via the first adhesive sheet 34a and the second adhesive sheet 34b.

In addition, the core material sheet 102, the cushion sheet 104, and the skin sheet 106 are delivered out respectively from the first main roll 30a through the third main roll 30c, and the first adhesive sheet 34a and the second adhesive sheet 34b are delivered out respectively from the first sub roll 32a and the second sub roll 32b. The first adhesive sheet 34a, which is delivered out from the first sub roll 32a, is interposed between the core material sheet 102 (core material layer 16) and the cushion sheet 104 (cushion layer 17), and the second adhesive sheet 34b, which is delivered out from the second sub roll 32b, is interposed between the cushion sheet 104 (cushion layer 17) and the skin sheet 106 (skin layer 18).

The five sheet materials are gathered together at the pressing rollers 36a and 36b, and are pressed when passing through the pressing rollers 36a and 36b. Due to such pressing, the core material sheet 102 and the cushion sheet 104 are provisionally bonded to each other via the first adhesive sheet 34a, and the cushion sheet 104 and the skin sheet 106 are provisionally bonded to each other via the second adhesive sheet 34b. Consequently, the sheet laminated article 38 (see FIG. 4C) is obtained.

After cutting out the sheet laminated article 38 to obtain the trimmed product 42, hot pressing, bending, and molding are carried out in the same manner as described above, whereby the resin molded article 10 including the resin covering layer 14 and the laminated body 12 that contains the core material layer 16, the cushion layer 17, and the skin layer 18, is obtained.

In order to obtain the sheet laminated article 38, it is also possible to use a coating machine known as a so-called coater. In this case, the paste adhesive 130 may be applied by the coater to each of the sheets 102, 104, and 106, and thereafter, the sheets 102, 104, and 106 may be bonded together.

In order to obtain the sheet laminated article 38, the skin sheet 106 may be heated with a burner or the like. In this case, the cushion sheet 104 is pressure-bonded to a melted surface of the skin sheet 106. In such a case, since the skin sheet 106 and the cushion sheet 104 can be bonded together without using the paste adhesive 130 or the adhesive sheets 34a and 34b, material costs can be reduced.

What is claimed is:

1. A method of manufacturing a resin molded article comprising a laminated body in which a skin layer, a cushion layer, and a core material layer are included and laminated, and a resin covering layer having a bottom portion and a surrounding portion, the method comprising a resin covering layer formation step comprising:

accommodating the laminated body in a cavity of an injection molding apparatus and injecting a molten resin therein;

allowing the molten resin to harden to form the resin covering layer having the bottom portion covering a lower surface of the laminated body, and the surrounding portion in which a peripheral edge portion of the laminated body is embedded; and obtaining the resin molded article in which an upper surface of the skin layer is exposed and serves as a design surface.

2. The method of manufacturing according to claim 1, further comprising a machining step of machining the laminated body into a predetermined shape, wherein the resin covering layer formation step is performed on the laminated body which has been subjected to machining in the machining step.

3. The method of manufacturing according to claim 2, further comprising a bending step of bending the laminated body which has been subjected to machining in the machining step, wherein the resin covering layer formation step is performed on the laminated body, which has been bent in the bending step.

* * * * *